US008406160B2

(12) United States Patent
Sureshchandran et al.

(10) Patent No.: US 8,406,160 B2
(45) Date of Patent: Mar. 26, 2013

(54) TIME-SLICED SEARCH OF RADIO ACCESS TECHNOLOGIES DURING CONNECTED-MODE RADIO LINK FAILURE

(75) Inventors: Swaminathan Sureshchandran, San Diego, CA (US); Bhupesh M. Umatt, Poway, CA (US); Kishore Srirambhatla, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 355 days.

(21) Appl. No.: 12/785,187

(22) Filed: May 21, 2010

(65) Prior Publication Data

US 2011/0286321 A1   Nov. 24, 2011

(51) Int. Cl.
*H04B 7/00* (2006.01)
(52) U.S. Cl. ..................................................... 370/310
(58) Field of Classification Search .......... 370/310–350; 700/90, 95, 97, 99; 709/223, 226
See application file for complete search history.

(56) References Cited

U.S. PATENT DOCUMENTS

| | | | |
|---|---|---|---|
| 7,155,261 B2 * | 12/2006 | Chen | 455/574 |
| 2003/0207702 A1 * | 11/2003 | Chen | 455/574 |
| 2007/0286155 A1 * | 12/2007 | Kaikkonen et al. | 370/350 |
| 2008/0008212 A1 | 1/2008 | Wang et al. | |
| 2009/0116378 A1 | 5/2009 | Jen | |
| 2009/0137265 A1 * | 5/2009 | Flore et al. | 455/525 |
| 2009/0275329 A1 * | 11/2009 | Sokondar et al. | 455/434 |
| 2010/0087193 A1 * | 4/2010 | Bishop et al. | 455/435.1 |
| 2010/0255807 A1 * | 10/2010 | Umatt et al. | 455/404.1 |
| 2011/0216732 A1 * | 9/2011 | Maeda et al. | 370/329 |
| 2011/0230183 A1 * | 9/2011 | Tanaka et al. | 455/423 |

FOREIGN PATENT DOCUMENTS

WO    WO2009020362 A2    2/2009

OTHER PUBLICATIONS

International Search Report and Written Opinion—PCT/US2010/042802, International Search Authority—European European Patent Office—Feb. 17, 2011.
Asustek, "Handling of Radio Link Failure", 3GPP Draft; R2-063158, 3rd Generation Partnership Project (3GPP), Mobile Competence Centre, 650, Route Des Lucioles: F-06921 Sophia-Antipolis Cedex, France: vol. RAN WG2, No. Riga, Latvia, Nov. 1, 2006, XP050132661.
Das D, et al., "Evaluation of mobile handset recovery from radio link failure in a multi-RATS environment", Internet Multimedia Services Architecture and Applications, 2008. IMSAA 2008. 2nd International Conference on, IEEE, Piscataway, NJ, USA. Dec. 10, 2008, pp. 1-6, XP031408578.

(Continued)

*Primary Examiner* — Fan Ng
(74) *Attorney, Agent, or Firm* — Kam T. Tam

(57) ABSTRACT

Systems and methodologies are described that facilitate apportioning a radio link failure (RLF) recovery timer among a plurality of radio access technologies (RAT). Once RLF is determined, a RLF recovery timer can be obtained and split according to a timer allocation. The timer allocation can include equal or weighted percentages related to the plurality of RATs, and a timer can be split according to the percentages to attempt connection using a RAT during a corresponding portion of the timer. In addition, the timer allocation can be defined according to a type of communication. In this regard, for voice calls, the timer can be split among circuit-switched networks regardless of a network from which connection is lost, and/or the like. Moreover, the timer allocation can be defined based on RAT deployment characteristics.

30 Claims, 10 Drawing Sheets

OTHER PUBLICATIONS

Interdigital, "Physical Channel Establishment and Radio Link Failure procedures", 3GPP Draft; R2-094804, 3rd Generation Partnership Project (3GPP), Mobile Competence Centre, 650, Route Des Lucioles ; F-06921 Sophia-Antipolis Cedex, France, No. Shenzhen, China, Aug. 18, 2009, XP050352822.

Asustek, "Handling of Radio Link Failure", 3GPP Draft; R2-063158, 3rd Generation Partnership Project (3GPP), Mobile Competence Centre, 650, Route Des Lucioles, F-06921 Sophia-Antipolis Cedex, France, vol. RAN WG2, No. Riga, Latvia, Nov. 1, 2006, XP050132661.

Interdigital, "Physical Channel Establishment and Radio Link procedures", 3GPP Draft; R2-094804, 3rd Generation Partnership Project (3GPP), Mobile Competence Centre, 650, Route Des Lucioles ; F-06921 Sophia-Antipolis Cedex, France, No. Shenzhen, China, Aug. 18, 2009, XP050352822.

International Search Report and Written Opinion—PCT/US2010/042802, International Search Authority—European Patent Office—Feb. 17, 2011.

* cited by examiner

TIME-SLICED SEARCH OF RADIO ACCESS TECHNOLOGIES DURING CONNECTED-MODE RADIO LINK FAILURE

BACKGROUND

1. Field

The following description relates generally to wireless communications, and more particularly to handling radio link failure.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, ... ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems may simultaneously support communication for multiple mobile devices. Each mobile device may communicate with one or more access points (e.g., base stations) via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. In addition, mobile devices can communicate with other mobile devices (and/or access points with other access points) in peer-to-peer wireless network configurations.

When communicating with one or more access points in a connected mode, however, a mobile device can experience radio link failure (RLF), which can occur when the mobile device loses connection to the one or more access points for a period of time. This can be caused by a deep fade of a signal from the one or more access points (e.g., where the mobile device is moving through a tunnel, across an area of varying altitude, in an elevator, and/or the like). The mobile device can detect the loss of signal (e.g., based on a degraded signal quality, receiving or not receiving cyclic redundancy headers, etc.) and can start a timer at the physical layer to determine RLF. Once this timer expires, the mobile device determines RLF has occurred and relies on upper layers to reinitialize connection with the one or more access points or disparate access points. In addition, for example, another timer can be specified during which connection is to be reinitialized by the upper layer before the mobile device switches to an idle mode. In 3GPP LTE, this can be a T311 or similar timer. In Wideband-CDMA, this can include T314 and/or T315 timers.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with facilitating searching for wireless network service over one or more radio access technologies (RAT) at least in part by splitting a related timer over the one or more RATs. For example, following radio link failure (RLF) of a wireless device while in a connected mode, a timer can be received from a physical layer during which RLF recovery is expected before switching the wireless device to an idle mode. The wireless device can split the timer among various RATs to attempt connection thereto for continuing communications with one or more access points in a timer allocation. In one example, the wireless device can split the timer evenly across one or more RATs or can weight certain RATs, etc. in the timer allocation. In addition, the wireless device can apportion time to RATs based at least in part on one or more communication parameters of the wireless device. For example, where the wireless device is in a call when RLF is determined, circuit switched RATs can be preferred over voice over internet protocol RATs in the timer allocation.

According to related aspects, a method is provided that includes receiving a timer related to recovering from a RLF and determining a portion of the timer related to at least one of a plurality of RATs defined in a timer allocation. The method further includes attempting connection using the at least one of the plurality of RATs during the portion of the timer.

Another aspect relates to a wireless communications apparatus. The wireless communications apparatus can include at least one processor configured to obtain a timer related to recovering from a RLF. The at least one processor is further configured to compute a portion of the timer related to at least one of a plurality of RATs based at least in part on a timer allocation and utilize the at least one of the plurality of RATs during the portion of the timer to attempt connection to an access point. The wireless communications apparatus also comprises a memory coupled to the at least one processor.

Yet another aspect relates to an apparatus. The apparatus includes means for receiving a timer related to recovering from a RLF and means for determining a portion of the timer related to at least one of a plurality of RATs defined in a timer allocation. The apparatus also includes means for attempting connection utilizing the at least one of the plurality of RATs during the portion of the timer.

Still another aspect relates to a computer program product, which can have a computer-readable medium including code for causing at least one computer to obtain a timer related to recovering from a RLF and code for causing the at least one computer to compute a portion of the timer related to at least one of a plurality of RATs based at least in part on a timer allocation. The computer-readable medium can also comprise code for causing the at least one computer to utilize the at least one of the plurality of RATs during the portion of the timer to attempt connection to an access point.

Moreover, an additional aspect relates to an apparatus including a RLF recovery timer component that receives a timer related to recovering from a RLF and a timer splitting component that determines a portion of the timer related to at least one of a plurality of RATs defined in a timer allocation. The apparatus can further include a RAT selecting component that attempts connection using the at least one of the plurality of RATs during the portion of the timer.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed and this description is intended to include all such aspects and their equivalents.

DETAILED DESCRIPTION

Figure 1:
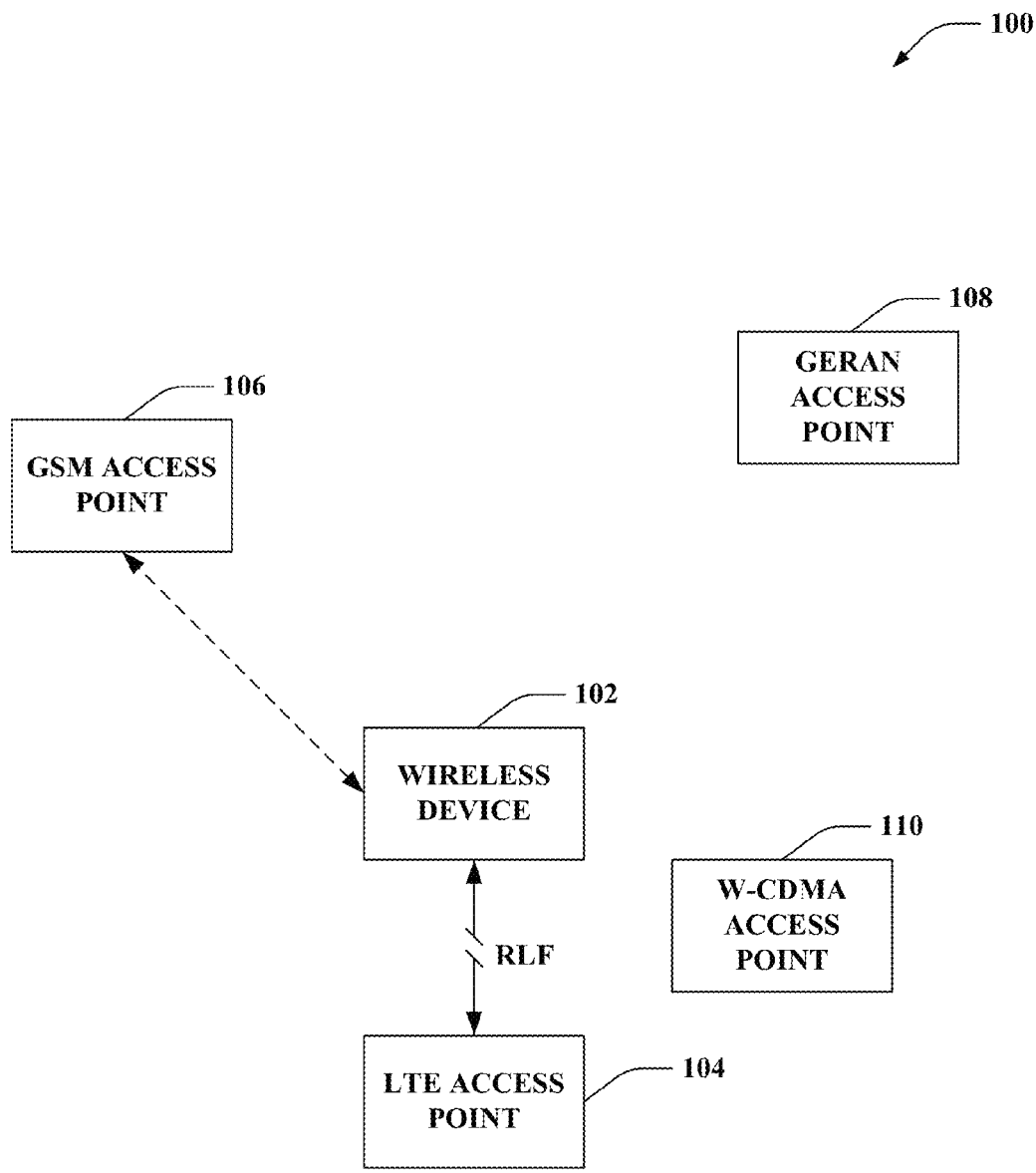
FIG. 1 is an illustration of an example wireless communications system that facilitates communicating using various radio access technologies (RAT).

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, a wireless communication system 100 is illustrated that facilitates communicating with access points of various radio access technologies (RAT). System 100 includes a wireless device 102 that receives wireless network access from one or more access points. In addition, LTE access point 104, GSM access point 106, GSM edge radio access network (GERAN) access point 108, and W-CDMA access point 110 are provided. The access points 104, 106, 108, and 110 each be a macrocell access point, femtocell or picocell access point, mobile base station, eNB, a portion thereof, and/or the like that provide access to a wireless network using the associated RAT. It is to be appreciated that additional access point can exist, such as data optimized (DO), 1x, WiMAX, etc. In addition, wireless device 102 can be a UE, a tethered device (such as a modem, etc.), a portion thereof, and/or the like that receives wireless network access.

According to an example, wireless device 102 can communicate with LTE access point 104 to receive access to a wireless network (not shown). Wireless device 102 can detect radio link failure (RLF) with LTE access point 104. For example, wireless device 102 can detect the RLF based at least in part on determining a degraded signal quality, discerning a lower number of received cyclic redundancy check (CRC) or similar headers, and/or the like. In addition, wireless device 102 can detect the RLF at a physical layer, and upon determining RLF, the physical layer can provide a timer to an upper layer. The timer can be a connected-mode out-of-service timer, RLF recovery timer, and/or the like, during which connection to a network can be established to avoid wireless device 102 entering an idle communication mode (e.g., a T311 timer in LTE, a T314 and/or T315 timer in W-CDMA, etc.). For example, the timer can be signaled in system information from LTE access point 104 (or one or more disparate access points), a dedicated signal for wireless device 102, and/or the like.

Upon receiving the timer from the physical layer, wireless device 102 can attempt connection to one or more RATs (e.g., by attempting to locate access points that utilize a given RAT, which can include listening for pilot signals, transmitting a preamble to initiate connection therewith, receiving a response, and/or the like) using the timer as an upper limit. In this regard, wireless device 102 can allocate portions of the timer to different RATs (e.g., according to a received or defined timer allocation). The portions can relate to percentages of the timer, which can be substantially equal among the RATs or weighted, and/or the like. Thus, for example, wireless device 102 can apportion 40% of the timer to LTE, 20% to GSM, 20% to W-CDMA, and 20% to LTE again according to the timer allocation, such that the percentage differs for the various RATs. In this example, if the timer is 10 seconds, wireless device 102 can attempt connection with LTE access points for four seconds, GSM access points for the following two seconds (if an LTE access point is not found or cannot be connected to), W-CDMA access points for the next two seconds, and LTE access points again for the last two seconds. Applying this example to the illustration, for example, wireless device 102, following RLF, can attempt to connect to LTE access point 104 and/or one or more access point for four seconds. This can fail due to no signal (or signal quality below a threshold level) with LTE access point 104 following the RLF. Thus, wireless device 102 can attempt connection using GSM in the following two seconds and can connect GSM access point 106. Since the connection succeeded, wireless device 102 has recovered from RLF and need not continue connection attempts during the RLF recovery timer.

The timer allocation and/or related percentages can be received from a configuration, hardcoding, network specification, network device, etc. and/or determined based at least in part on one or more parameters regarding communications with LTE access point 104. Where wireless device 102 is in a voice call using LTE access point 104 at the time of RLF, for example, a timer allocation can be generated by wireless device 102 having percentages favoring circuit-switched (CS) networks, such as W-CDMA, GERAN, 1x, etc., instead of data centric RATs, such as LTE, to provide optimal RLF recovery for the voice call. In one example, the wireless device 102 can generate a timer allocation that does not attempt connection to LTE access points at all when in a voice call during RLF.

In another example, wireless device 102 can generate the timer allocation based at least in part on deployment characteristics, which can be received from an access point as one or more parameters in one example, determined based on historical connection parameters, and/or the like. For example, where wireless device 102 is in an area that is heavily LTE deployed (e.g., an urban area), wireless device 102 can allocate a high percentage of the timer to connecting to an LTE access point, as RLF is likely temporary given the deployment characteristics. In another example, the timer allocation or related percentages can be signaled from one or more access points. In any case, splitting the timer to attempt connection to various RATs can improve connection reliability of wireless device 102 and decrease power consumption by lowering an amount of time the wireless device 102 is attempting to recover from RLF.

Figure 2:
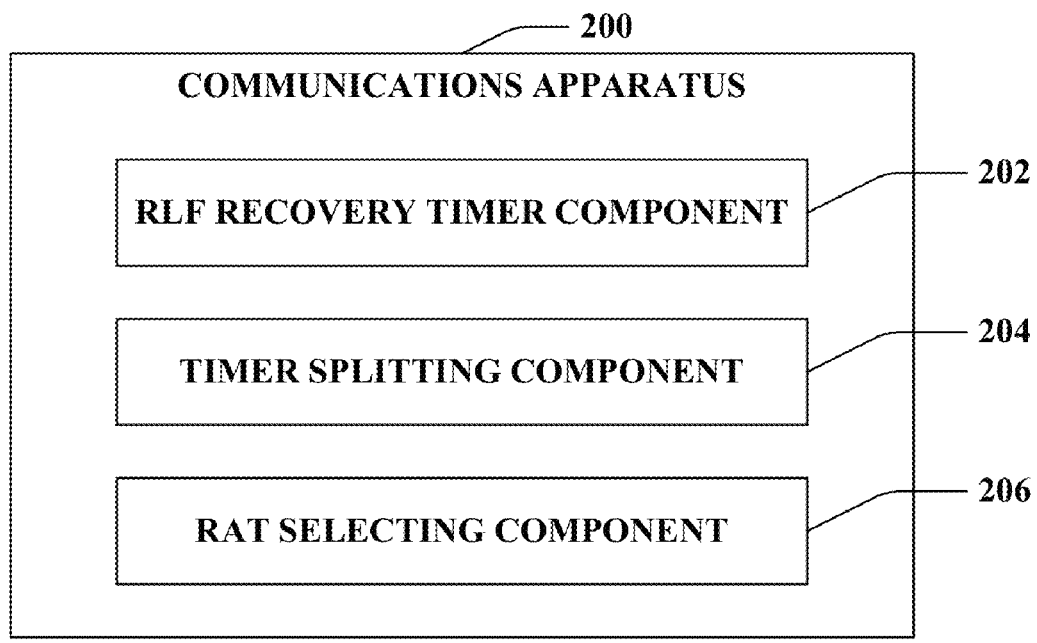
FIG. 2 is an illustration of an example communications apparatus for employment within a wireless communications environment.

Turning to FIG. 2, a communications apparatus 200 that can participate in a wireless communications network is illustrated. The communications apparatus 200 can be a mobile device (e.g., a UE, modem or other tethered device, and/or the like), a portion thereof, or substantially any device that establishes a connection to one or more access points in a wireless network. The communications apparatus 200 can include a RLF recovery timer component 202 that obtains a connected-mode out-of-service or RLF recovery timer (e.g., T311, T314, T315, and/or the like) from a physical layer, a timer splitting component 204 that allocates portions of the timer for connection attempts to a plurality of RATs, and a RAT selecting component 206 that attempts connection to the plurality of RATs.

According to an example, RLF recovery timer component 202 can obtain a timer from the physical layer following determination of RLF. The timer, as described, can relate to a period of time for reconnecting with a wireless network before communications apparatus 200 is switched to an idle mode. In addition, RLF recovery timer component 202 can obtain the timer at a radio resource control (RRC) or similar layer, as signaled by an access point (e.g., in system information, a dedicated signal, and/or the like). Timer splitting component 204 can compute portions of the timer for attempting connection with a plurality of RATs according to a timer allocation. The timer allocation can be received (e.g., from a configuration, hardcoding, network specification, network device, etc.) or defined by timer splitting component 204. As described, timer splitting component 204 can apportion the timer among a plurality of RATs according to configured percentages in the timer allocation related to the RATs. The RATs can include LTE, GSM, W-CDMA, GERAN, DO, 1x, WiMAX, and/or substantially any RAT. In any case, the timer allocation can apportion substantially equal percentages to each RAT in a set of RATs. In another example, the timer allocation can weight certain RATs more than others (e.g., which can include specifying different percentages for the RATs), exclude some RATs from the set of RATs, and/or the like.

For example, timer splitting component 204 computes portions of the timer according to the percentages specified in the timer allocation. In an example, timer splitting component 204 defines a more complicated timer allocation. In one such allocation, timer splitting component 204 can allocate fixed times to one or more of the RATs in the set and/or percentages to the remaining RATs (e.g., defining a timer allocation that specifies at least four seconds to LTE, 50% of the remaining timer time, if any, to GSM, and the other 50% to W-CDMA). As described, timer splitting component 204 can define the timer allocation based at least in part on one or more parameters regarding a state of communications apparatus 200. For example, where communications apparatus 200 is in a call, timer splitting component 204 can weight and/or figure percentages only for CS RATs to focus on continuing the call rather than connecting with a data centric RAT. In another example, where communications apparatus 200 is communicating an amount of data over a threshold with an LTE access point, timer splitting component 204 can weight at least most of the timer to LTE RATs.

Moreover, in an additional or alternative example, timer splitting component 204 can allocate percentages related to a set of RATs based at least in part on receiving deployment characteristics for a RAT, which can be received from an access point or otherwise determined by timer splitting component 204. For example, in an area that is heavily deployed LTE, timer splitting component 204 can allocate a greater portion of the timer to LTE RATs as opposed to a remaining portion of RATs in the set. In one example, timer splitting component 204 can determine deployment characteristics based at least in part on an achieved data rate over a period of time (e.g., if communications apparatus 200 is able to achieve a high LTE rate over a period of time, it can assume it is in an area that is highly LTE deployed). In another example, timer splitting component 204 can receive one or more parameters from an access point indicating a favored or highly deployed RAT in the area and can utilize the one or more parameters in weighting percentages in the timer allocation. Moreover, as described, timer splitting component 204 determines an order of the timers and can include repeat proportions in the timer allocation based on parameters described above. For example, in a heavily deployed LTE area, timer splitting component 204 can allocate 40% to LTE, then 15% to GSM, 15% to LTE, 15% to W-CDMA, and the last 15% to LTE again.

In any case, RAT selecting component 206 can attempt to establish connection with the set of RATs during the specified timer according to the timer allocation. This can include switching among RATs as specified in the timer allocation during the corresponding portions of the timer. Once RAT selecting component 206 is able to establish a connection according to the timer allocation, it can conclude connection attempts. Moreover, it is to be appreciated that the components 202, 204, and/or 206 can be implemented within a multi mode selection system (MMSS) layer of the communications apparatus 200. In this regard, a physical layer can communicate the timer to the MMSS layer, and the MMSS layer can attempt connection among a set of RATs to provide optimal RLF recovery, as described.

Figure 3:
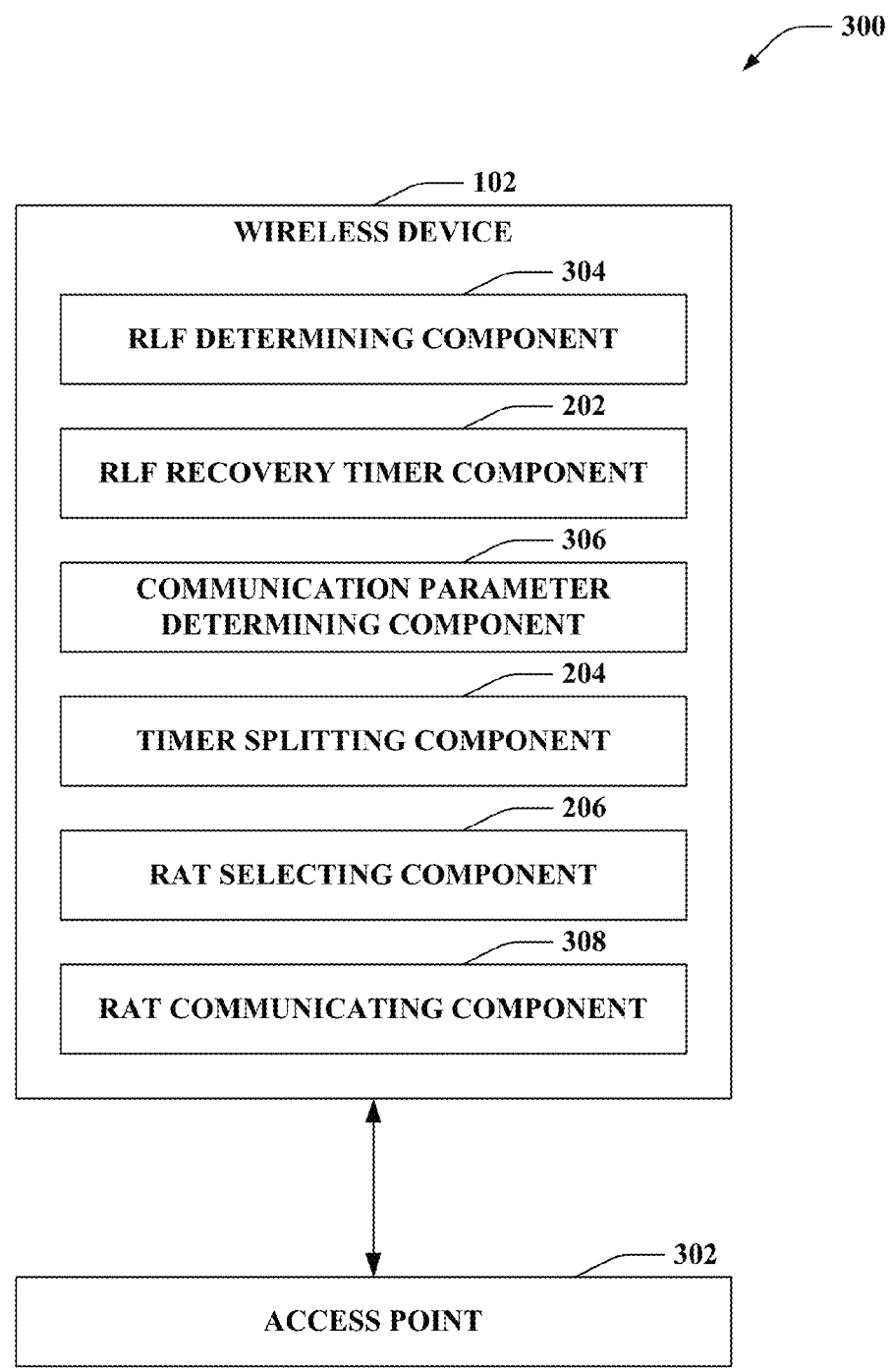
FIG. 3 is an illustration of a wireless communications system that splits a radio link failure (RLF) recovery timer among a plurality of RATs.

Now referring to FIG. 3, illustrated is a wireless communications system 300 that facilitates splitting a timer among multiple RATs in attempting recovery from RLF. System 300 includes a wireless device 102 that receives access to a wireless network (not shown) from one or more access points, such as access point 302. Wireless device 102 can be a UE, modem (or other tethered device), a portion thereof, and/or substantially any device that receives access to a wireless network. In addition, for example, access point 302 can be a macrocell access point, femtocell access point, picocell access point, mobile base station, a portion thereof, and/or substantially any device that provides wireless network access. In addition, access point 302 can utilize an associated RAT to communicate with one or more wireless devices.

Wireless device 102 can include a RLF determining component 304 that can detect RLF at a physical layer, a RLF recovery timer component 202 that can obtain a connected-mode out-of-service timer, RLF recovery timer, and/or a similar timer from an access point, and a communication parameter determining component 306 that can discern one or more parameters regarding wireless device 102 communications. Wireless device 102 can also include a timer splitting component 204 that apportions the timer (e.g., according to the one or more parameters or otherwise), a RAT selecting component 206 that attempts connection to one or more access points of the RATs based on the timer apportionment, and a RAT communicating component 308 that communicates with an access point following connection thereto.

According to an example, wireless device 102 can communicate with access point 302 to receive access to a wireless network. RLF determining component 304 can detect RLF with respect to access point 302 at a physical layer. As described, RLF determining component 304 can detect the RLF based at least in part on measuring a signal quality that has degraded below a threshold level, determining a reduction in received CRC headers, etc., over a period of time. Upon detecting RLF, RLF determining component 304 can provide a timer to an upper layer (e.g., MMSS layer) during which connection to an access point can be established to prevent wireless device 102 from entering an idle mode. RLF recovery timer component 202 can obtain the timer, as described.

In an example, communication parameter determining component 306 can receive or discern one or more parameters related to wireless device 102, such as one or more types of communication (e.g., voice, data, video streaming, etc.) with access point 302, wireless network deployment characteristics based on location, and/or the like, as described. Timer splitting component 204 can receive or generate a timer allocation for attempting communication to a plurality of RATs based on the one or more parameters or otherwise, as described. Thus, for example, timer splitting component 204 can apportion more time to LTE in the timer allocation where wireless device 102 is streaming or communicating other data packets, where wireless device 102 is in a location that has optimal LTE coverage, etc., and the parameters can be determined and/or signaled from an access point, as described. Similarly, where communication parameter determining component 306 discerns that wireless device 102 is in a voice call, timer splitting component 204 can generate a timer allocation that apportions the timer to attempt connection with CS RATs only, at a greater percentage, before attempting connection to data centric RATs, and/or the like, as described. In any case, timer splitting component 204 can apply the timer allocation to the timer to associate portions of the timer with a plurality of RATs.

RAT selecting component 206 can subsequently attempt connection to one or more RATs according to the timer split. Thus, for example, RAT selecting component 206 can determine a first RAT in a set of RATs and a related timer portion and can attempt connection to one or more access points utilizing the RAT during the portion of the timer. Upon expiration of the portion of the timer, RAT selecting component 206 can determine a next RAT in the set and a next portion of the timer, and can attempt connection to one or more access points utilizing the next RAT during the next portion of the timer, and so on. Upon establishing connection with an access point having a given RAT, RAT communicating component 308 can transmit to and/or received from the access point using the RAT. Moreover, RAT selecting component 206 can cease connection attempts once a connection is established. Where RAT selecting component 206 cannot establish connection to a RAT within the received timer, wireless device 102 can switch to an idle mode.

Figure 4:
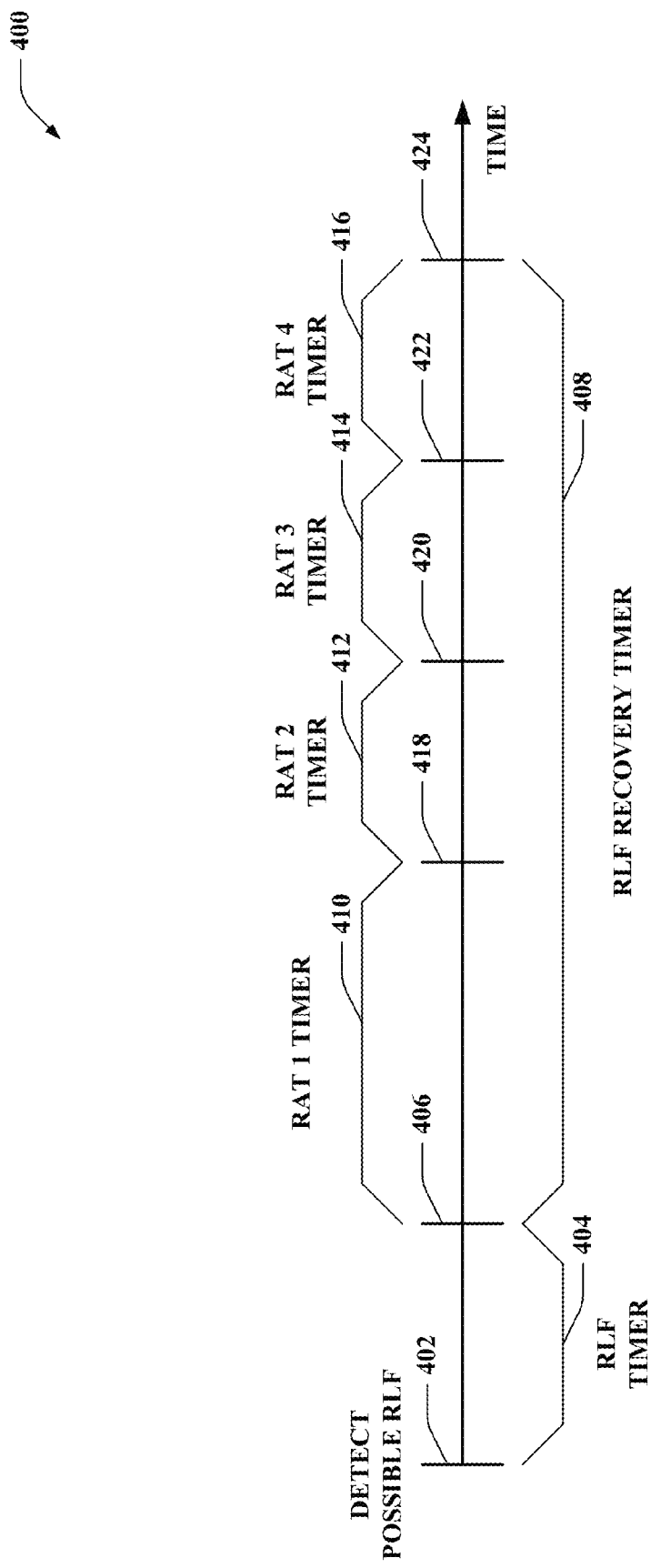
FIG. 4 is an illustration of an example timeline that corresponds to separating a RLF recovery timer among multiple RATs.

Turning to FIG. 4, an example timeline 400 utilized by a wireless device to recover from RLF is depicted. At 402, a possible RLF can be detected. As described, for example, RLF can be detected based at least in part on detecting a signal quality below a threshold, a number of CRC headers received, and/or the like over a period of time. RLF timer 404 can be activated upon detecting the possible RLF at 402. As described detecting the possible RLF 402 and utilizing the RLF timer 404 can be performed at a physical layer. Upon expiration of the RLF timer 404 at 406, a RLF recovery timer 408 can be initiated at the physical layer. Additionally, at 406, the physical layer can pass the RLF recovery timer value to an MMSS layer or similar upper layer. The MMSS layer can split the RLF recovery timer 408 into a plurality of RAT timers 410, 412, 414, and 416.

For example, the MMSS layer can associate RAT 1 timer 410 to a first RAT, and a wireless device can attempt connection to one or more access points that utilize the first RAT during the RAT 1 timer 410. If at 418 no connection to an access point using RAT 1 is established, the MMSS layer can attempt connection to one or more access points using a second RAT during RAT 2 timer 412. Similarly, if at 420 a connection to an access point using the second RAT is not established, the MMSS layer can attempt connection to one or more access points using a third RAT during RAT 3 timer 414. Again, if at 422 a connection to an access point using the third RAT is not established, the MMSS layer can attempt connection to one or more access points using a fourth RAT during RAT 4 timer 422. If RAT 4 timer 416 expires with no connection at 424, then the wireless device can switch to an idle mode. As described previously, it is to be appreciated that the first, second, third, and fourth RATs can each be distinct, or one or more of the RATs can be substantially the same. In one example, as described, where the wireless device is in a call when RLF is determined at 406, the MMSS layer can associate the first, second, third, and/or fourth RATs to CS capable RATs regardless of the RAT at the time of RLF.

Figure 5:
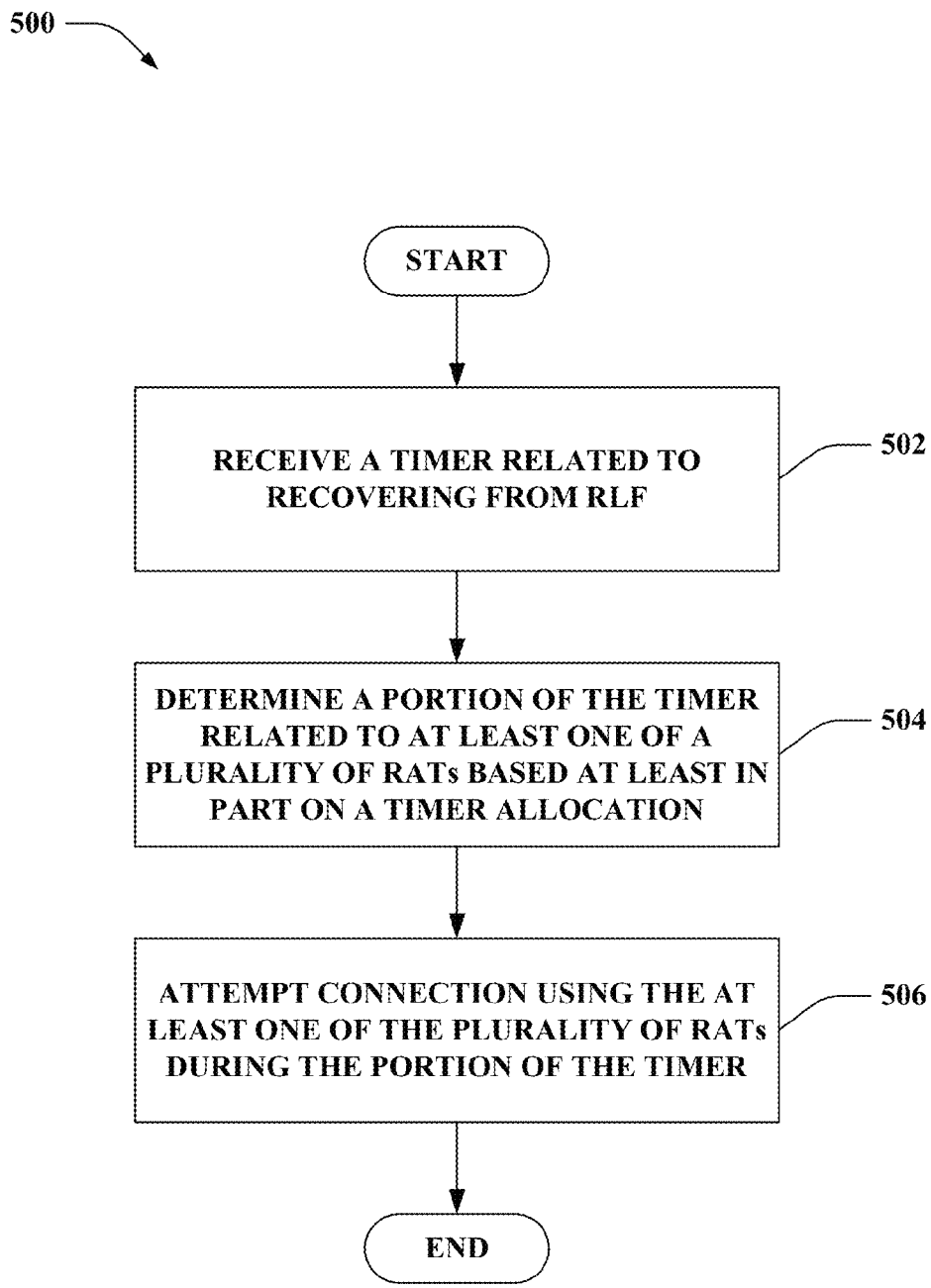
FIG. 5 is an illustration of an example methodology for apportioning a RLF recovery timer among a plurality of RATs.
Figure 6:
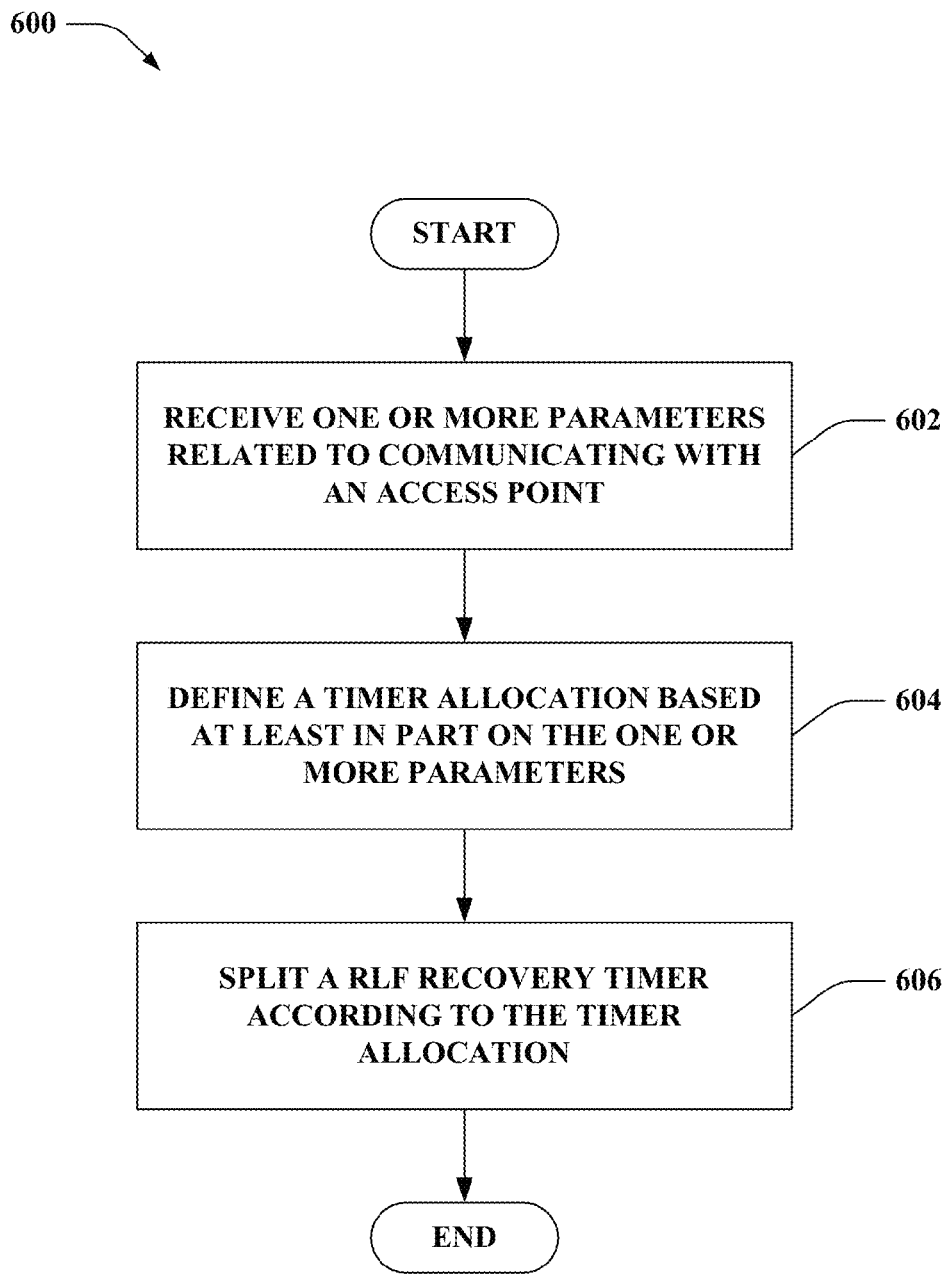
FIG. 6 is an illustration of an example methodology that determines one or more parameters for splitting a RLF recovery timer.
Figure 7:
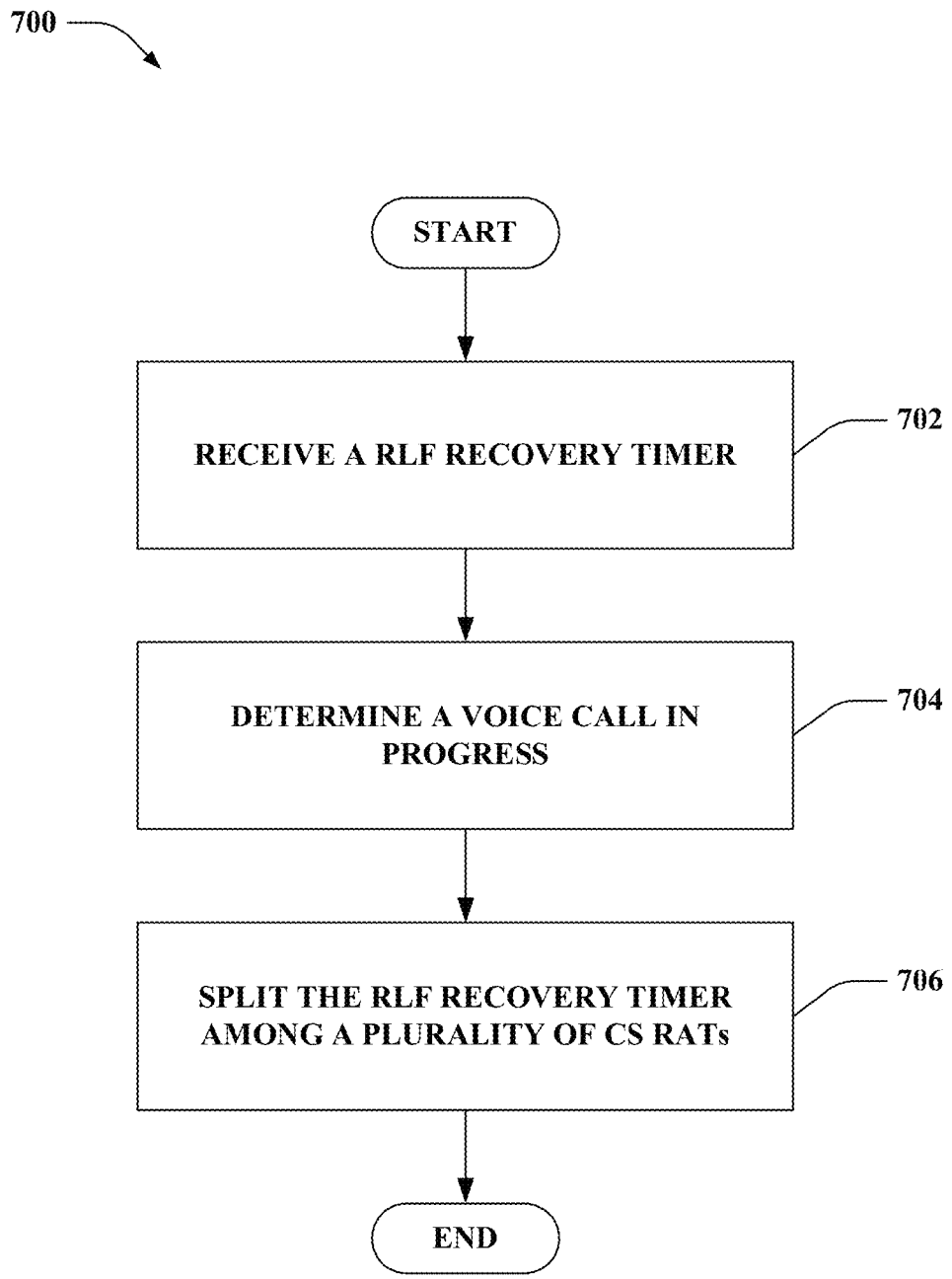
FIG. 7 is an illustration of an example methodology that specifies a plurality of circuit-switched RATs for a timer allocation.

Referring to FIGS. 5-7, methodologies relating to apportioning a RLF recovery timer among a plurality of RATs are illustrated. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Turning to FIG. 5, an example methodology 500 that facilitates splitting a RLF recovery timer among a plurality of RATs is illustrated. At 502, a timer related to recovering from RLF can be received. As described, the timer can be received from a physical layer following determination of RLF, and/or the like. In addition, the timer can be a T311, T314, T315, and/or similar timers such that a device can enter an idle mode following expiration of the timer where the connection is not recovered. At 504, a portion of the timer related to the at least one of a plurality of RATs can be determined based at least in part on a timer allocation. For example, as described, the timer allocation can include percentages related to each of the plurality of RATs, and the portion of the timer can be determined by applying a percentage related to a RAT to the timer. In addition, for example, the timer allocation can be received, defined according to one or more communication parameters, and/or the like. At 506, connection using the at least one of the plurality of RATs can be attempted during the portion of the timer. It is to be appreciated that where connection cannot be established during the portion of the timer, the next RAT in the plurality of RATs can be used to attempt connection during a next portion of the timer related to the next RAT, as described.

Referring to FIG. 6, an example methodology 600 is depicted that facilitates apportioning a RLF recovery timer among various RATs. At 602, one or more parameters related to communicating with an access point can be received. As described, for example, the one or more parameters can relate to a type of communications with the access point (e.g., voice, data, streaming, etc.), RAT deployment characteristics in the area, and/or the like. At 604, a timer allocation can be defined based at least in part on the one or more parameters. Thus, for example, where the one or more parameters relate to a voice call, a timer allocation can be defined over a plurality of RATs that are CS capable. Where the one or more parameters relate to streaming or a certain type of data connection, a timer allocation can be defined to provide higher weight to RATs such as LTE or other data centric RATs, as described. At 606, a RLF recovery timer can be split according to the timer allocation. In this regard, for example, the timer allocation can relate to a plurality of percentages for a plurality of RATs, and the percentages can be applied to the RLF recovery timer to determine portions of the timers for attempting connection using the plurality of RATs.

Turning to FIG. 7, an example methodology 700 is depicted that facilitates splitting a RLF recovery timer among a plurality of CS capable RATs. At 702, a RLF recovery timer can be received. As described, the timer can be received from a physical layer following RLF determination. At 704, it can be determined that a voice call is in progress (e.g., based at least in part on one or more parameters regarding communicating with an access point, as described). At 706, the RLF recovery timer can be split among a plurality of CS RATs. Thus, for example, since a call is in progress, a plurality of CS RATs can be determined for continuing the call, and the timer is apportioned among the CS RATs, as described.

It will be appreciated that, in accordance with one or more aspects described herein, inferences can be made regarding determining a timer allocation among a plurality of RATs and/or other aspects described herein. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
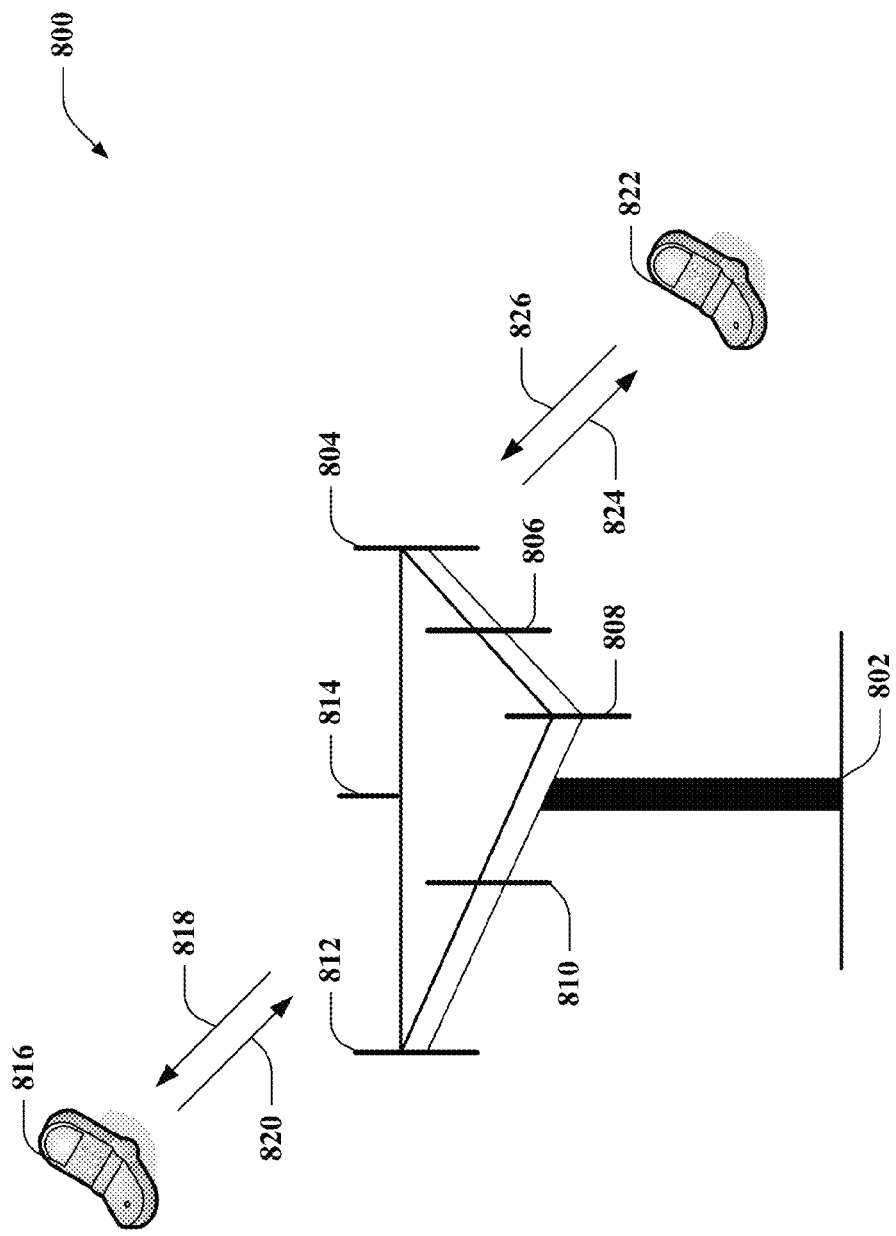
FIG. 8 is an illustration of a wireless communication system in accordance with various aspects set forth herein.

Referring now to FIG. 8, a wireless communication system 800 is illustrated in accordance with various embodiments presented herein. System 800 comprises a base station 802 that can include multiple antenna groups. For example, one antenna group can include antennas 804 and 806, another group can comprise antennas 808 and 810, and an additional group can include antennas 812 and 814. Two antennas are illustrated for each antenna group; however, more or fewer antennas can be utilized for each group. Base station 802 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 802 can communicate with one or more mobile devices such as mobile device 816 and mobile device 822; however, it is to be appreciated that base station 802 can communicate with substantially any number of mobile devices similar to mobile devices 816 and 822. Mobile devices 816 and 822 can be, for example, cellular phones, smart phones, laptops, handheld communication devices, handheld computing devices, satellite radios, global positioning systems, PDAs, and/or any other suitable device for communicating over wireless communication system 800. As depicted, mobile device 816 is in communication with antennas 812 and 814, where antennas 812 and 814 transmit information to mobile device 816 over a forward link 818 and receive information from mobile device 816 over a reverse link 820. Moreover, mobile device 822 is in communication with antennas 804 and 806, where antennas 804 and 806 transmit information to mobile device 822 over a forward link 824 and receive information from mobile device 822 over a reverse link 826. In a frequency division duplex (FDD) system, forward link 818 can utilize a different frequency band than that used by reverse link 820, and forward link 824 can employ a different frequency band than that employed by reverse link 826, for example. Further, in a time division duplex (TDD) system, forward link 818 and reverse link 820 can utilize a common frequency band and forward link 824 and reverse link 826 can utilize a common frequency band.

Each group of antennas and/or the area in which they are designated to communicate can be referred to as a sector of base station 802. For example, antenna groups can be designed to communicate to mobile devices in a sector of the areas covered by base station 802. In communication over forward links 818 and 824, the transmitting antennas of base station 802 can utilize beamforming to improve signal-to-noise ratio of forward links 818 and 824 for mobile devices 816 and 822. Also, while base station 802 utilizes beamforming to transmit to mobile devices 816 and 822 scattered randomly through an associated coverage, mobile devices in neighboring cells can be subject to less interference as compared to a base station transmitting through a single antenna to all its mobile devices. Moreover, mobile devices 816 and 822 can communicate directly with one another using a peer-to-peer or ad hoc technology (not shown).

According to an example, system 800 can be a multiple-input multiple-output (MIMO) communication system. Further, system 800 can utilize substantially any type of duplexing technique to divide communication channels (e.g., forward link, reverse link, . . . ) such as FDD, FDM, TDD, TDM, CDM, and the like. In addition, communication channels can be orthogonalized to allow simultaneous communication with multiple devices over the channels; in one example, OFDM can be utilized in this regard. Thus, the channels can be divided into portions of frequency over a period of time. In addition, frames can be defined as the portions of frequency over a collection of time periods; thus, for example, a frame can comprise a number of OFDM symbols. The base station 802 can communicate to the mobile devices 816 and 822 over the channels, which can be create for various types of data. For example, channels can be created for communicating various types of general communication data, control data (e.g., quality information for other channels, acknowledgement indicators for data received over channels, interference information, reference signals, etc.), and/or the like.

Figure 9:
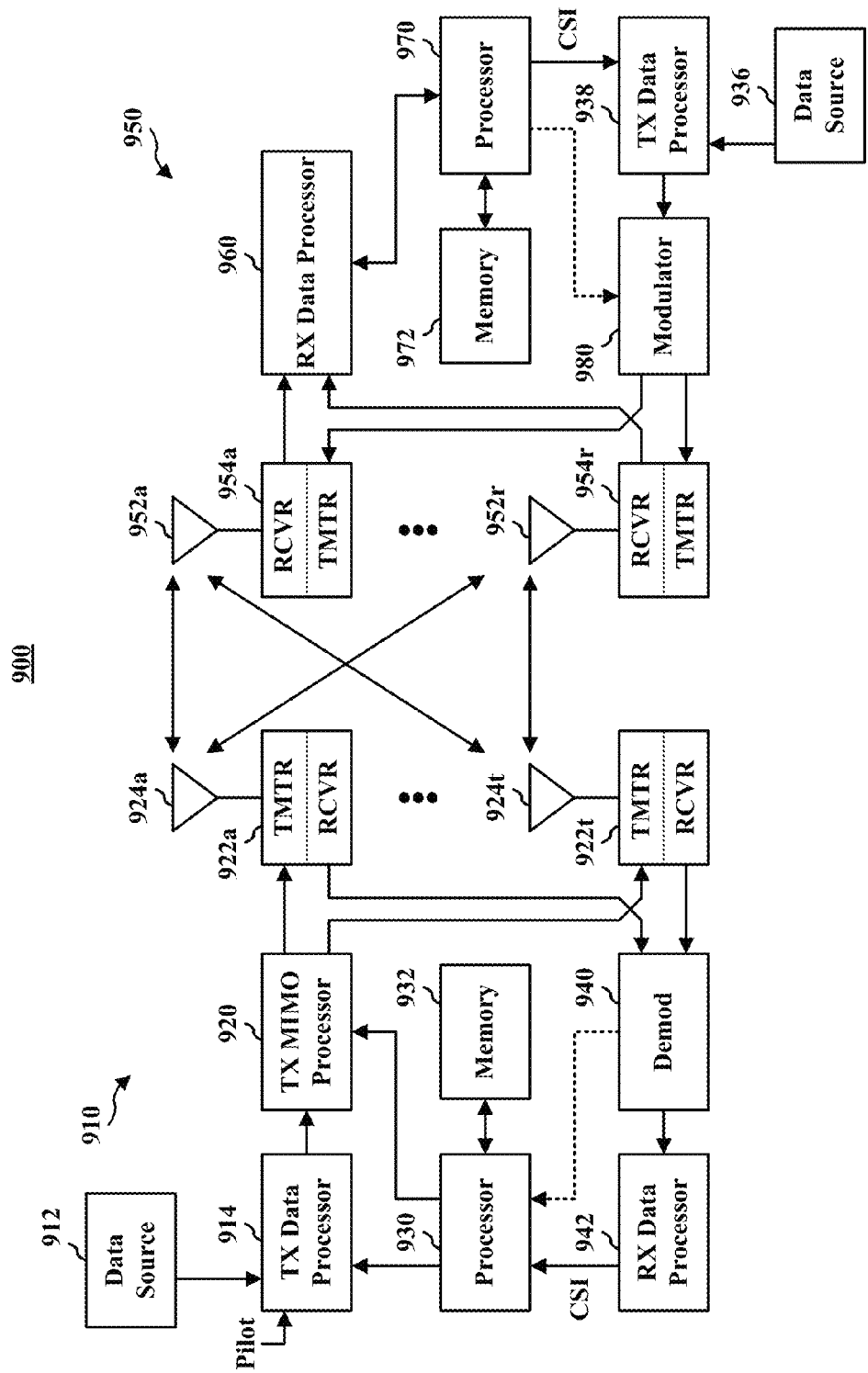
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-4 and 8) and/or methods (FIGS. 5-7) described herein to facilitate wireless communication therebetween.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various aspects, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which precoding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g., control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

Figure 10:
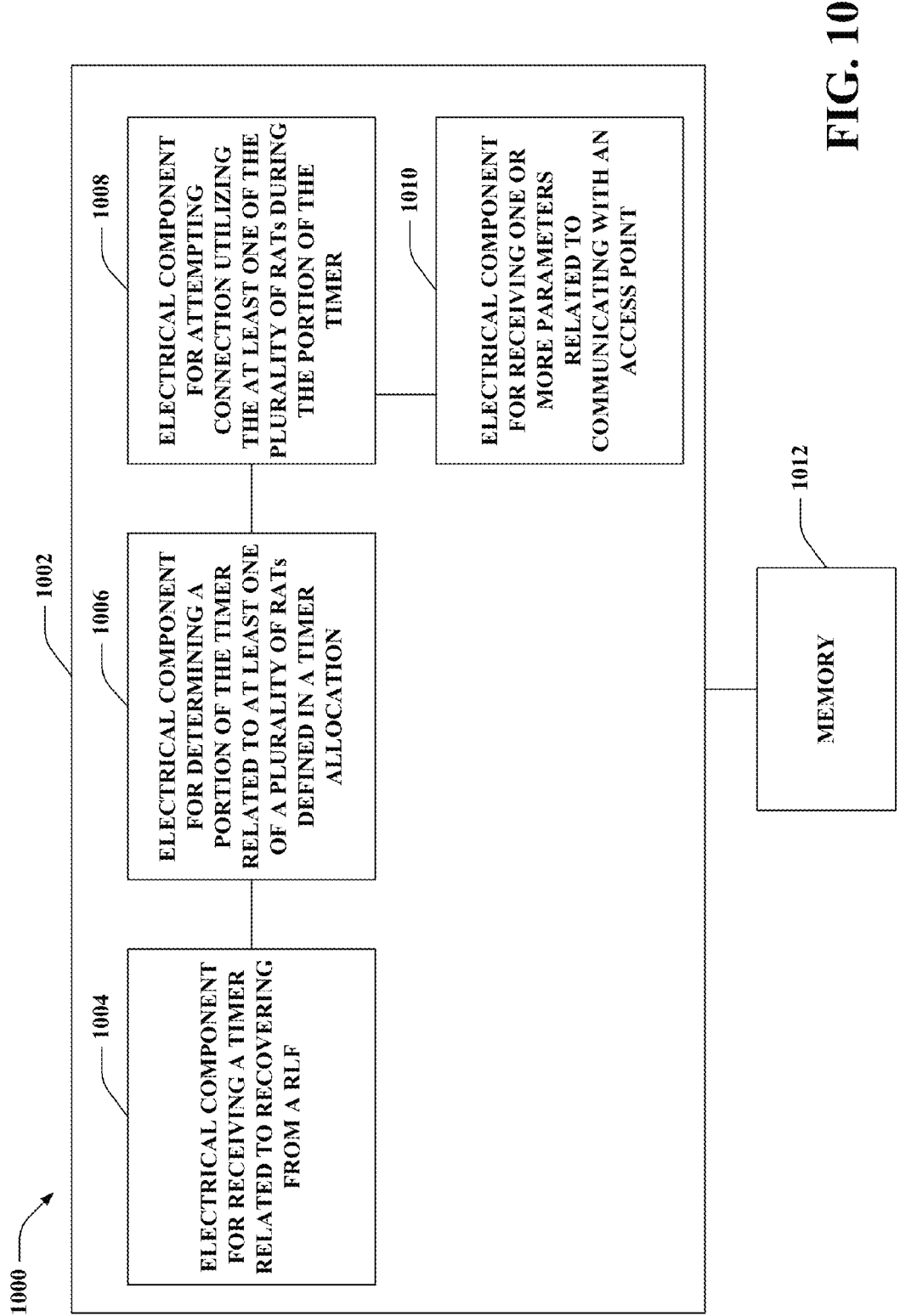
FIG. 10 is an illustration of an example system that apportions a RLF recovery timer among a plurality of RATs.

With reference to FIG. 10, illustrated is a system 1000 that facilitates apportioning a RLF recovery timer among multiple RATs. For example, system 1000 can reside at least partially within a base station, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for receiving a timer related to recovering from a RLF 1004. For example, as described, the timer can be received from the physical layer and can be a T311, T314, T315, or similar timer that specifies a period for reestablishing a connection before entering an idle mode. Additionally, logical grouping 1002 can include an electrical component for determining a portion of the timer related to at least one of a plurality of RATs defined in a timer allocation 1006. As described, the timer allocation can be received from a configuration, hardcoding, network specification, etc., determined based at least in part on one or more communication parameters, received from a network device, and/or the like.

Moreover, logical grouping 1002 can include an electrical component for attempting connection utilizing the at least one of the plurality of RATs during the portion of the timer 1008. In this regard, as described, electrical component 1008 can further attempt connection utilizing a next one of the plurality of RATs according to a corresponding next portion of the timer. In addition, logical grouping 1002 can include an electrical component for receiving one or more parameters related to communicating with an access point 1010. As described, the timer allocation can be defined based at least in part on the one or more parameters. Additionally, system 1000 can include a memory 1012 that retains instructions for executing functions associated with electrical components 1004, 1006, 1008, and 1010. While shown as being external to memory 1012, it is to be understood that one or more of electrical components 1004, 1006, 1008, and 1010 can exist within memory 1012.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions, procedures, etc. may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Furthermore, to the extent that the term "includes" is used in either the detailed description or the claims, such term is intended to be inclusive in a manner similar to the term "comprising" as "comprising" is interpreted when employed as a transitional word in a claim. Furthermore, although elements of the described aspects and/or aspects may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method, comprising:
   receiving a timer allocation to recover from a radio link failure, the timer allocation being defined as a plurality of percentages respectively corresponding to a plurality of radio access technologies based at least in part on one or more parameters;
   apportioning the timer allocation into a plurality of timer portions, each one of the plurality of timer portions being associated with one of the plurality of radio access technologies; and
   attempting connection using at least one radio access technology during the associated timer portion.

2. The method of claim 1, wherein apportioning the timer allocation comprises computing the plurality of timer portions based at least in part on one of the plurality of percentages that is specified for at least one of the plurality of radio access technologies in the timer allocation.

3. The method of claim 2, wherein each one of the plurality of percentages differs from a disparate percentage specified for a disparate one of the plurality of radio access technologies.

4. The method of claim 2, further comprising receiving the one or more parameters, wherein the one or more parameters are related to communicating with an access point.

5. The method of claim 1 wherein the one or more parameters relate to a voice call, and wherein circuit-switched radio access technologies are specified as the plurality of radio access technologies.

6. The method of claim 1, wherein the one or more parameters comprise received deployment characteristics related to a deployed radio access technology, and wherein a disparate percentage is specified for the deployed radio access technology than for a remaining portion of the plurality of radio access technologies.

7. The method of claim 1, further comprising:
   determining a disparate portion of the timer allocation related to a next one of the plurality of radio access technologies defined in the timer allocation; and
   attempting connection to the next one of the plurality of radio access technologies during the disparate portion of the timer allocation.

8. The method of claim 1, wherein receiving the timer allocation to recover from the radio link failure comprises receiving the timer allocation from a physical layer.

9. The method of claim 1, wherein the apportioning of the timer allocation is performed at a multi mode selection system layer.

10. A wireless communications apparatus, comprising:
    at least one processor configured to:
      obtain a timer allocation to recover from a radio link failure, the timer allocation being defined as a plurality of percentages respectively corresponding to a plurality of radio access technologies based at least in part on one or more parameters;
      apportion the timer allocation into a plurality of timer portions, each one of the plurality of timer portions being associated with one of the plurality of radio access technologies; and
      utilize at least one radio access technology during the associated timer portion to attempt connection to an access point; and
    a memory coupled to the at least one processor.

11. The wireless communications apparatus of claim 10, wherein the at least one processor computes each of the plurality of timer portions based at least in part on applying one of the plurality of percentages related to the at least one of the plurality of radio access technologies for the associated timer portion.

12. The wireless communications apparatus of claim 11, wherein the applied one of the plurality of percentages differs from a disparate percentage in the plurality of percentages related to a disparate one of the plurality of radio access technologies.

13. The wireless communications apparatus of claim 11, wherein the at least one processor is further configured to receive the one or more parameters, wherein the one or more parameters are related to communications with the access point or a disparate access point.

14. The wireless communications apparatus of claim 10, wherein the one or more parameters relate to a voice call, and the plurality of percentages are related to a plurality of circuit-switched radio access technologies.

15. The wireless communications apparatus of claim 10, wherein the one or more parameters relate to a deployed radio access technology, and the plurality of percentages include at least one percentage for the deployed radio access technology that is greater than another percentage for a disparate radio access technology.

16. An apparatus, comprising:
    means for receiving a timer allocation to recover from a radio link failure, the timer allocation being defined as a plurality of percentages respectively corresponding to a plurality of radio access technologies based at least in part on one or more parameter;

means for apportioning the timer allocation into a plurality of timer portions, each one of the plurality of timer portions being associated with one of the plurality of radio access technologies; and means for attempting connection using at least one radio access technology during the associated timer portion.

17. The apparatus of claim 16, wherein the means for apportioning the timer allocation applies one of the plurality of percentages related to the at least one of the plurality of radio access technologies for the associated timer portion.

18. The apparatus of claim 16, further comprising means for receiving the one or more parameters, wherein the one or more parameters are related to communicating with an access point.

19. The apparatus of 16, wherein the one or more parameters relates to a voice call, and the plurality of percentages are related to a plurality of circuit-switched radio access technologies.

20. The apparatus of claim 16, wherein the one or more parameters relates to a deployed radio access technology, and the means for apportioning the timer allocation defines the timer allocation to include at least one percentage for the deployed radio access technology that is greater than another percentage for a disparate radio access technology.

21. A computer program product, comprising:

a non-transitory computer-readable medium comprising:

code for causing at least one computer to obtain a timer allocation to recover from a radio link failure, the timer allocation being defined as a plurality of percentages respectively corresponding to a plurality of radio access technologies based at least in part on one or more parameters;

code for causing the at least one computer to apportion the timer allocation into a plurality of timer portions, each one of the plurality of timer portions being associated with one of the plurality of radio access technologies; and code for causing the at least one computer to utilize at least one radio access technology during the associated timer portion to attempt connection to an access point.

22. The computer program product of claim 21, wherein the code for causing the at least one computer to apportion is based at least in part on one of the plurality of percentages related to the at least one of the plurality of radio access technologies for the associated timer portion being applied.

23. The computer program product of claim 22, wherein the one of the plurality of percentages differs from a disparate percentage in the plurality of percentages related to a disparate one of the plurality of radio access technologies.

24. The computer program product of claim 22, wherein the non-transitory computer-readable medium further comprises code for causing the at least one computer to receive the one or more parameters, wherein the one or more parameters are related to communications with the access point or a disparate access point.

25. The computer program product of claim 21, wherein the one or more parameters relate to a voice call, and the plurality of percentages are related to a plurality of circuit-switched radio access technologies.

26. The computer program product of claim 21, wherein the one or more parameters relate to a deployed radio access technology, and the plurality of percentages include at least one percentage for the deployed radio access technology that is greater than another percentage for a disparate radio access technology.

27. An apparatus, comprising:

a radio link failure (RLF) recovery timer component that receives a timer allocation to recover from a RLF, the timer allocation being defined as a plurality of percentages respectively corresponding to a plurality of radio access technologies based at least in part on one or more parameters;

a timer splitting component that apportions the timer allocation into a plurality of timer portions, each one of the plurality of timer portions being associated with one of the plurality of radio access technologies; and a radio access technology selecting component that attempts connection using at least one radio access technology during the associated timer portion.

28. The apparatus of claim 27, further comprising a communication parameter determining component that receives the one or more parameters, wherein the one or more parameters are related to communicating with an access point.

29. The apparatus of claim 27, wherein the one or more parameters relates to a voice call, and the plurality of percentages are related to a plurality of circuit-switched radio access technologies.

30. The apparatus of claim 27, wherein the one or more parameters relates to a deployed radio access technology, and the timer splitting component defines the timer allocation to include at least one percentage for the deployed radio access technology that is greater than another percentage for a disparate radio access technology.

* * * * *